United States Patent [19]
Speickhoff

[11] 3,777,306
[45] Dec. 4, 1973

[54] VEHICLE ELECTRONIC SECURITY DEVICE

[75] Inventor: Lester T. Speickhoff, St. Louis, Mo.

[73] Assignee: Arthur G. Simpson, St. Louis, Mo.; a part interest

[22] Filed: Oct. 16, 1972

[21] Appl. No.: 297,593

[52] U.S. Cl. ............... 340/64, 307/10 AT, 200/46, 180/114
[51] Int. Cl. .......................................... B60r 25/04
[58] Field of Search ............................. 340/63, 64; 307/10 AT; 200/46; 180/114

[56] References Cited
UNITED STATES PATENTS
3,634,880   1/1972   Hawkins ................... 340/63

*Primary Examiner*—Alvin H. Waring
*Attorney*—Edmund C. Rogers et al.

[57] ABSTRACT

An electronic security device for interposition in the ignition circuit of a motor vehicle and including a receptacle having coded indicia along at least one inner surface thereof corresponding to coded indicia of a card adapted for insertion in the receptacle, and transport means for transporting the card within the receptacle to cause juxtaposition of the coded indicia of the card with the coded indicia of the receptacle, the device including primary electrical switch means electrically connected therein so that juxtaposition of the coded indicia closes the ignition circuit through the device.

14 Claims, 12 Drawing Figures

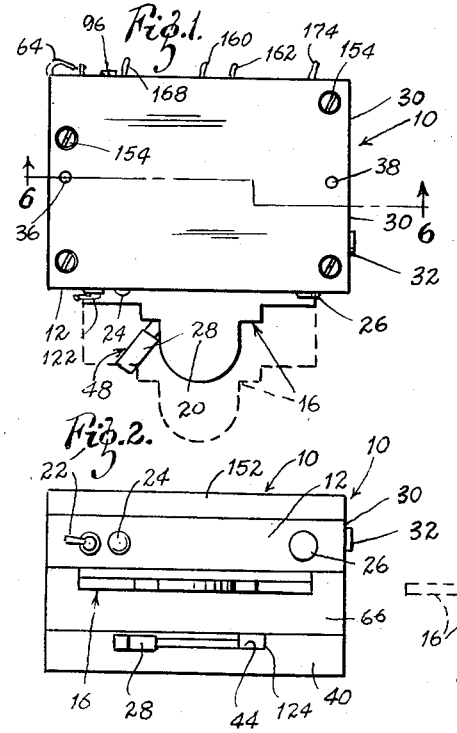
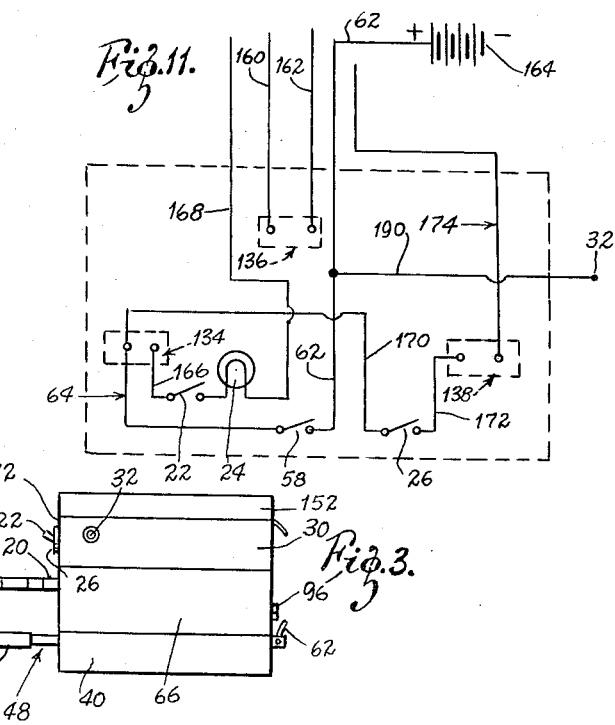
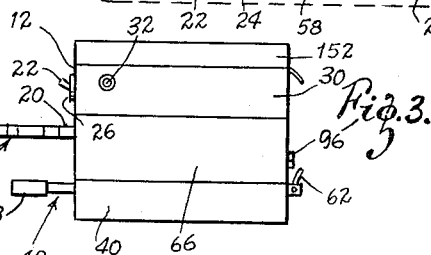
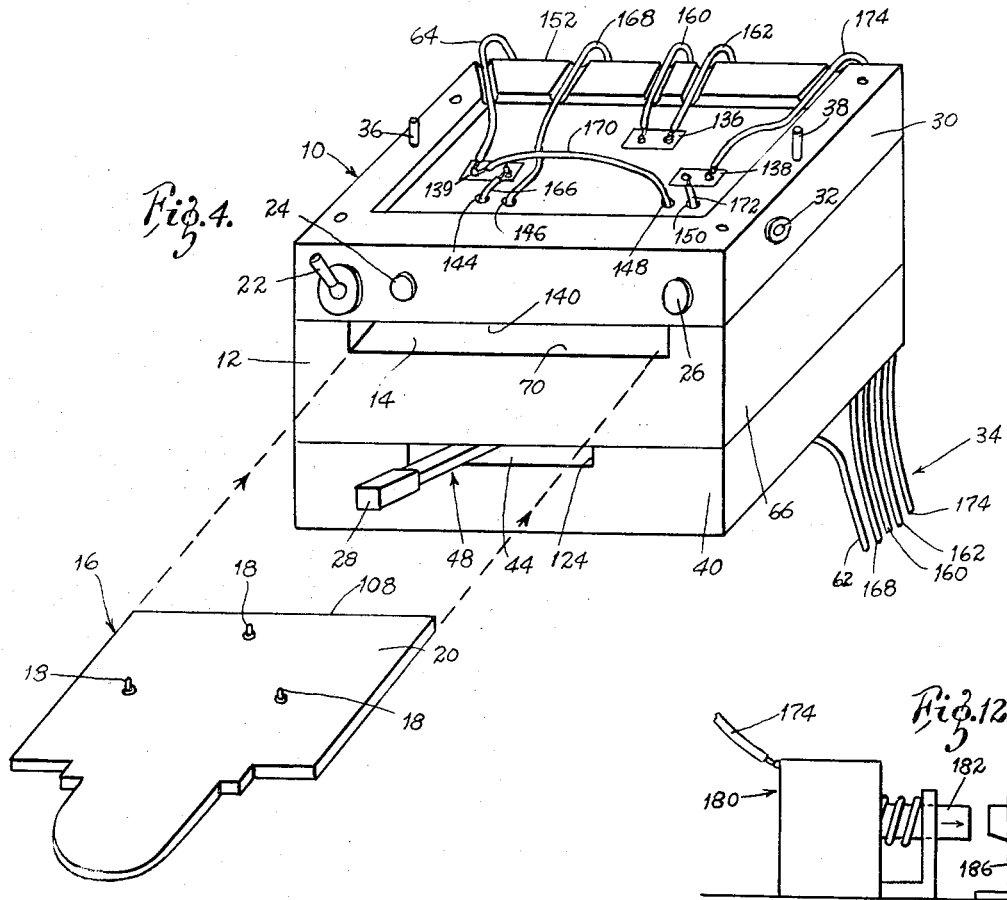
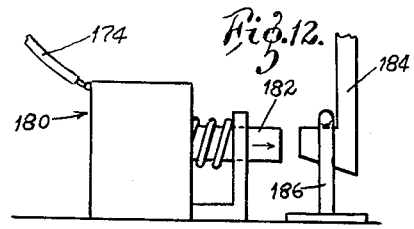

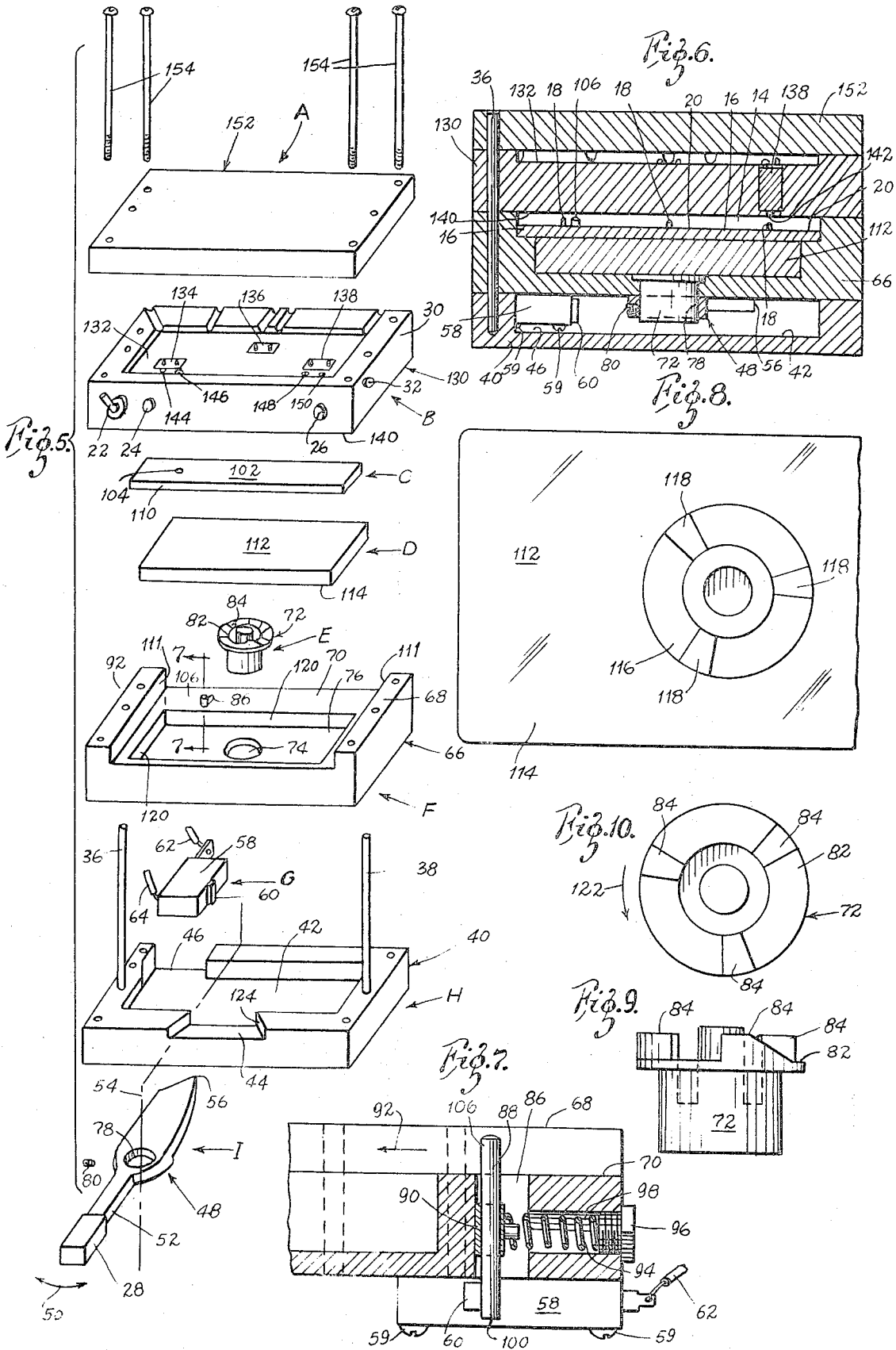

VEHICLE ELECTRONIC SECURITY DEVICE

The present invention relates to a security system for motor vehicles such as automobiles, boats and the like and particularly relates to a tamper-proof device which easily may be installed in motor vehicles and connected in the electrical system thereof.

Auto theft, including theft of various automobile accessories, has become an increasingly serious national problem. The high incidence of these crimes, particularly in urban areas, has prompted research into methods for preventing such crimes from occurring. Research in this area dates back to at least 1923 (U.S. Pat. No. 1,442,487) wherein the electro-mechanical locking mechanism for motor vehicles was proposed. More recent research in this area is reported in U.S. Pat. Nos. 3,453,591; 3,524,989; 3,544,804; 3,611,287; 3,624,602 and 3,649,961. Due perhaps in large measure to the expense involved in equipping automobiles with such devices, none have apparently met with acceptance either by motor vehicle manufacturers or by motor vehicle owners. Many of these devices (U.S. Pat. Nos. 3,544,804; 3,611,287, etc.) have involved highly sophisticated electronic equipment.

It is readily apparent that the need is great for a reliable, yet inexpensive, security system for motor vehicles. To be successful, such a system must be simple to operate, inexpensive (so that it may be purchased by motor vehicle owners of modest means), and easy and inexpensive to install. Yet, the system must provide reliable protection.

It is hence an object of the invention to provide a security system for motor vehicles which is easy and inexpensive to install, and which is reliable and capable of easy operation.

It is another object of the invention to provide a motor vehicle security system capable of easy installation in the ignition circuit of a motor vehicle and adapted to be mounted on the dashboard hereof.

It is another object of the invention to provide a security system for automobiles requiring, for operation, insertion of a coded card therein and integrally including circuits for unlocking the hood and trunk of the motor vehicle.

It is yet another object of the invention to provide a security system for motor vehicles which includes a hood locking and opening circuit and which further provides means for employing an external source of electrical power should the internal power supply of the motor vehicle fail.

Briefly, the present invention relates to an electronic security device for interposition in the ignition circuit of a motor vehicle. The device comprises a. means defining an elongated receptacle having coded indicia along at least one inner surface thereof corresponding to coded indicia of a card adapted for insertion in the receptacle;

b. transport means for transporting the card within the receptacle to cause juxtaposition of the coded indicia of the inner surface of the receptacle with that of the card after insertion of the card in the receptacle;

c. an electric circuit interposable in the ignition circuit of a motor vehicle; and d. primary electrical switch means interrupting said electric circuit and closable by juxtaposition of the coded indicia to close sais electric said through the device.

In the drawing:

FIG. 1 is a plan view of the device of the present invention with coded card inserted, but without wiring;

FIG. 2 is a front view of the device of FIG. 1;

FIG. 3 is a side view of the device of FIG. 1;

FIG. 4 is a perspective view of the device of the present invention shown with the top cover removed;

FIG. 5 is an exploded view of the device depicted in FIG. 4 showing separate parts A through I inclusive, without wiring;

FIG. 6 is a cross sectional view taken generally along lines 6—6 of FIG. 1;

FIG. 7 is a cross sectional view, partly broken away, taken along lines 7—7 of FIG. 5 E and showing also FIG. 5 G;

FIG. 8 is a bottom view, partially broken away, of the part shown as D in FIG. 5;

FIG. 9 is a side view of the part as E in FIG. 5;

FIG. 10 is a top view of the part shown in FIG. 9;

FIG. 11 is a schematic wiring diagram of the device of the invention; and

FIG. 12 is a side view of a trunk-release mechanism.

Referring first to FIG. 4, the device of the invention is designated generally as 10 and is adapted for mounting preferably in the dashboard or other control section of a motor vehicle with the front surface 12 thereof being displayed to the operator. The device includes means defining an elongated receptacle shown generally as 14 for reception therewith of a coded card 16, the code taking, for example, the form of predeterminedly located pins 18 arising from the surface thereof. Included in the front surface 12 is a toggle switch 22 for closing an electrical circuit leading, for example, to a hood release mechanism a signal light 24 which glows when the toggle switch circuit is closed, a push-button 26 for closing an electrical circuit leading, for example, to a trunk-releasing mechanism, and an externally operable projection shown as handle 28, movement of which transports the coded card 16 within the elongated receptacle 14 and further closes certain circuits within the device, as will be explained below. Surface 30 of the device bears jack-plug 32 for connection of an external source of power. The wires leading to and from the device preferably are collected in a bundle 34 which may be led through appropriate tamper-proof metal tubing into the hood section of a motor vehicle.

Referring now to FIG. 5, the device of the present invention in one embodiment may be assembled from a series of parts, the larger of which are labeled A through I, inclusive for convenience. A base member 40 (FIG. 5 H) is provided with a recessed top surface 42, a frontwardly extending, slightly elevated wedge-shaped surface 44 and a rearwardly extending recessed surface 46. The recessed top surface 42 is adapted to receive level member 48 (FIG. 5 I) such that movement of the level handle 28 in the direction shown by arrow 50 causes the lever member 48 to pivot about its axis 54, shank portion 52 of the lever moving across surface 48 and the end 56 of the lever describing an arc across recessed surface 42. Secondary switch means, consisting of microswitch 58 (FIG. 5 G) is positioned upon rearwardly extending surface 46 of the base 40, and is held in position by attachment to intermediate member 66 by screws 59. Microswitch 58 is provided with a small projection 60 positioned to be contacted by tip 56 of the lever 48 when the handle 28 of the lever 48 is moved to the right, thereby closing the circuit between leads 62 and 64 of the microswitch.

Seated upon base 40 is intermediate plate member 66, the upper surface 68 of which is depressed as shown at 70 to form a portion of the lower surface of elongated receptacle 14 (FIG. 4) into which coded card 16 may be inserted. Bushing 72 (FIG. 5 E and FIGS. 9 and 10) is inserted into orifice 74 in a further depressed area 76 of depressed surface 70 of intermediate plate 66 and thence passes through orifice 78 in lever member 48 where it is held firmly by means of set screw 80. Thus, movement of lever member 48 in the direction shown by arrow 50 in turn causes bushing 72 to rotate on axis 54. Lever 48 is shown off-set in FIG. 5 to facilitate the drawing.

The upper surface 82 of bushing 72 is provided with a series of upwardly extending teeth 84 about its periphery (FIGS. 9 and 10), the purpose of which will be subsequently explained.

The rearward portion of depressed surface 70 of intermediate plate 66 has an elongated orifice 86 therethrough bearing movable vertical pin member 88 (FIG. 7). Pin 88 is supported within orifice 86 by sleeve 90, which in turn is urged in the direction shown by arrow 92 (FIG. 5 F and FIG. 7) by a spring assembly depicted in FIG. 7 as spring 94 and retaining plug 96 carried within rearwardly extending orifice 98. The orifice 86 bearing pin 88 is so positioned as to permit the lower portion 100 of the pin, under the pressure of spring 94, to assume a position closely adjacent projection 60 of microswitch 58, as shown in FIG. 7. Movement of the handle 28 of the lever 48 to the right causes the end 56 of the lever member to encounter lower portion 100 of the pin, thereby preventing operation of the microswitch 58 by depression of projection 60 of the microswitch.

Sliding plate member 102 (FIG. 5 C) is slidingly seated upon the rearward portion of depressed surface 70 of intermediate plate 66 (FIG. 5 F). Plate 102 has an orifice 104 adjacent one end thereof which receives upwardly extending portion 106 of pin 88. Thus, movement of the plate 102 in a rearward direction moves pin 88 in the direction opposite to that shown by arrow 92 (FIG. 5 F and FIG. 7). In this retracted position, lower end 100 of the pin is removed rearwardly a short distance from projection 60 of microswitch 58 so that pin 88 is no longer encountered by tip 56 of the lever member 48 when the lever member is operated, thereby permitting tip 56 to contact and depress the microswitch projection 60. Recessed portion 70 of intermediate plate 66, as noted above, forms the lower portion of an elongated receptacle 14 into switch coded card 16 may be inserted. Upon insertion of the card, the leading edge 108 thereof bears against forward edge 110 of the sliding plate member 102, forcing the sliding plate member in a rearwardly direction which in turn moves pin 88 rearwardly out of the path of tip 56 of the lever 48 so that the tip of the lever may contact and depress microswitch projection 60.

Bias plate 112 (FIGA. 5 D and 8) is removably seated in depressed area 76 of intermediate plate 66. The bottom surface 114 of the bias plate is provided with a centrally located, downwardly extending annular projection 116 having a toothed lower surface, the teeth being shown at 118 in FIG. 8. Tooth projection 116 is adapted to cooperate with toothed bushing 72 (FIGS. 9 and 10) such that the toothed surfaces intermesh.

Bias plate 112 is prevented from rotational movement with respect to intermediate plate 66 by the walls 120 which laterally bound depressed area 76. Thus, when bushing 72 is rotated as shown by arrow 122 in FIG. 10, the intermeshing teeth 84 and 118 co-act to cam bias plate 112 in an upwardly direction. After the bias plate 122 has been thus elevated to its maximum height, the platen surfaces of teeth 84 and 118 may slide across each other for a short distance.

The lever 48 and microswitch 58 are so positioned that the tip 56 of the lever contacts projection 60 of the microswitch only when the lever has been moved to an extreme right hand position, as limited by the vertical wall 124 bounding wedge-shaped surface 44 of the base plate. In a preferred embodiment, the pitch of teeth 84 of bushing 72 is chosen so that substantially maximum elevation is imparted to the bias plate 112 when the handle 28 of the lever is moved to the right to an extent just insufficient to cause tip 56 of the lever to contact projection 60 of the microswitch. Further movement of handle 28 to the right causes the flat surfaces of teeth 84 and 118 to slide across each other, maintaining the bias plate in the elevated position, and permitting the tip 56 of the lever to contact the projection 60 of the microswitch 58. Thus, it will be understood that microswitch 60 cannot be operated until bias plate 112 has assumed substantially its maximum elevated position in response to movement of handle 28 to the right.

Mounted upon the upper surface 68 of intermediate plate 66 is switch plate 130 (FIG. 5 B, FIG. 6). Inserted into three partial holes drilled into the slightly recessed upper surface 132 of switch plate 130 are three microswitches 134, 136 and 138, microswitch 138 being pictured in cross-section in FIG. 6. Microswitches 134, 136 and 138 are bottom-operated; that is, they are actuated by an upwardly directed force. As exemplified in FIG. 6, the microswitches 134, 136 and 138 are positioned sufficiently close to the lower surface 140 of switch plate 130 so as to be activated by pins 18 carried by the coded card 16 when the coded card is biased upwardly in the elongated receptacle 14. The undersurface 140 of switch plate 130 contains small predeterminedly located pin holes 142 aligned with the inserted microswitches 134, 136 and 138, through which pins 18 may extend to contact the microswitches. Also provided in the switch plate are pairs of orifices 144, 146 and 148, 150, through which microswitches 134 and 138 in switchplate 130 may be electrically connected to toggle switch 22, light 24 and pushbutton 26, as will be subsequently explained. Microswitches 134, 136 and 138 are provided with upwardly extending sets of terminals to which appropriate electrical connections can be made. These microswitches, as well as microswitch 58, are commercially available items and preferably are selected to carry at least 7 amperes ( 15 amperes for switch 58).

Cover plate 152 serves to cover the recessed surface 132 of the switchplate. Base plate 40, intermediate plate 66, switch plate 130 and the cover plate are held in rigid alignment by pins 36 and 38 by bolts identified generally as 154.

As thus assembled, coded card 16 may be inserted into the elongated receptacle 14, thereby pushing back sliding plate member 102 which in turn causes pin 88 to move out of the line of travel of the end 56 of the lever member 48. Movement of the handle portion 28 of the lever to the right causes bias plate 112 to be elevated, thereby lifting the coded card bodily upwardly within the elongated receptacle, predeterminedly located pins 18 on the coded card entering the relatively located pin holes 142 in the lower surface of the switch block 130 to activate microswitches 134, 136 and 138. Further movement of lever 48 to the right causes activation of microswitch 58, tip 56 of the lever depressing projection 60 of the microswitch. It will thus be understood that at least microswitches 134 and 138 are always activated before microswitch 58 when the lever 48 is moved to the right. Similarly, movement of the lever to the left de-activates the microswitches in switch plate 130 only after microswitch 58 has been de-activated.

Further, microswitch 58 cannot be activated until sliding plate member 102 has been moved rearwardly by insertion of the coded card into the device (thus moving pin 88 out of the line of travel of lever end 56). In the preferred embodiment, the leading edge 108 of card 16 is shaped to coincide with forward edge 110 of the sliding plate member 102 so as to smoothly move the plate member rearwardly between walls 111 of the supporting intermediate plate 66 without cocking or jamming which would occur if another instrument such as a knife blade or the like were inserted in the receptacle 14 in an attempt to move the sliding plate rearwardly.

Referring now to FIGS. 4 and 11 of the drawing, leads 160 and 162 are connected into the ignition system of a motor vehicle so that the security device of the invention interrupts the ignition circuit. For example, leads 160 and 162 may be connected respectively to the coil and to the distributor of a motor vehicle. Activation of microswitch 136 by insertion of the coded card and movement of the lever to the far right closes the ignition system through the device (although the usual, separate key operation of the ignition and starter circuits is also desired). Although the primary electrical switch means represented by microswitch 136 in the drawing requires only the coded card 16 be elevated within elongated receptacle 14 in order to close the ignition circuit through the security device 10, it is understood that the primary electrical switch means may include other switches, similarly operated, which may close other electrical circuits through the security device.

Microswitches 134 and 138 are exemplified as operating in circuits for opening of the hood and trunk respectively of a motor vehicle, and operate as follows: lead 62 is connected to the battery 164 of the motor vehicle, and transmits electrical current directly to microswitch 58. Microswitch 58 is connected to microswitch 134 by lead 64. From switch 134, current is directed through lead 166 to toggle switch 22, thence to light 24 and through lead 168 to a hood-opening mechanism which may, as pointed out above, operate by means of a solenoid mechanism in a manner known to the art. Energizing of the hood-opening solenoid mechanism thus is accomplished by inserting coded card 16 into the elongated receptacle 14, moving of lever 28 to the right to cause sequential closing of microswitches 134 and 58, the movement of toggle switch 22 to the closed position. When all of these switches have been closed, and the solenoid is in the retracted position for opening the hood, light 24 will glow, notifying the operator that the solenoid is being held in the open position. Because opening of an automobile hood, for example, requires the operator to manually operate various mechanical levers at the front of the hood, toggle switch 22 is provided to maintain the solenoid mechanism in the open position while the hood is being opened from outside of the automobile. A suitable solenoid mechanism for use in the present invention is shown in FIGS. 1–3 of U.S. Pat. No. 3,611,287. It should be noted that as lever 28 is thrown to the right, microswitch 134 is necessarily energized prior in time to microswitch 58, thereby eliminating the possibility of arcing in microswitch 134.

Lead 170 is connected to lead 64 at microswitch 134, and conducts electricity to pushbutton switch 26 on the face of the security device. Electricity is thence conducted by lead 172 to microswitch 138, and thence to lead 174 to a trunk-release mechanism 180, as exemplified in FIG. 12 of the drawing. Electrical energy transmitted to the solenoid causes the plunger 182 thereof to strike the latch 184 of the trunk cover and disengage the same from the latch 186 which is attached to the trunk floor, thereby permitting the trunk to spring open. Since the trunk of a motor vehicle is normally held closed only by the action of latch 184 and latch 186, there is no need to maintain the solenoid plunger 182 in the forward position after latch 184 has disengaged latch 186; hence, a pushbutton switch may be used to advantage in this circuit. Thus, after microswitches 138 and 58 have been sequentially closed by movement of lever 28 to the right, operation of pushbutton 26 will cause the trunk to open.

Microswitches 134 and 138, as referred to herein, represent primary circuit breakers of the device. It is understood, of course, that other primary circuit breakers may also be employed in the device of the present invention for operation of the various other electrical devices of a motor vehicle. As described above, microswitch 58, herein called secondary switch means is always closed after closure of primary circuit breakers represented by microswitches 134 and 138, thereby preventing arcing in these primary circuit breakers.

The device of the present invention also preferably includes means for employing an outside source of power should the battery of the motor vehicle fail. In this regard, electrical jack 32 (FIGS. 4 and 11) is provided on one side of the security device for transmitting electrical energy through lead 190 to lead 62 so that the hood release mechanism may be operated by insertion of the card 16, movement of the lever 48 and operation of toggle switch 22. Thus gaining access to the hood of an automobile, one may replace the battery thereof or take other measures to start the automobile. As an anti-theft measure, it will be noted in its preferred embodiment that connection of an outside source of electrical power to jack 32 will not provide power to the ignition circuit through the security device of the invention.

As noted above, the various electrical wires leading from the device are bundled together at the rear of the device and are passed through a rigidly supported pipe into the motor compartment of a motor vehicle (e.g., beneath the hood of an automobile) so as to prevent would-be theives from attempting to start the vehicle by short-circuiting of the electrical wiring.

Although the device has been described by exemplary reference to the drawing therein certain components were assembled in a layer construction (e.g., from suitably machined sections of a phenotic laminated insulating board), other constructions more amenable to mass production are contemplated, such as pressure-forming of plastic parts and the like.

It is to be understood that the foregoing description and the accompanying drawings have been given by way of illustration and example. It is also to be understood that changes in form of the several parts, substitution of equivalent elements or steps, and rearrangement of parts, or steps, which will be readily apparent to one skilled in the art, are contemplated as within the scope of the present invention, which is limited only by the claims which follow.

What is claimed is:

1. Electronic security device for interposition in the ignition circuit of a motor vehicle and comprising:
   a. means defining an elongated receptacle having coded indicia along at least one inner surface thereof corresponding to coded indicia of a card adapted for insertion in the receptacle;
   b. transport means for transporting said card within said receptacle to cause juxtaposition of the coded indicia of said card with the coded indicia of said at least one inner surface of the receptacle after insertion of said card in said receptacle;
   c. an electric ciruit interposable in the ignition circuit of a motor vehicle; and
   d. primary electrical switch means interrupting said electric circuit and closable by said juxtaposition of coded indicia to close said electric circuit through said device.

2. The device of claim 1 wherein said transport means includes an externally operable projection, operation of which transports said card laterally within said receptacle to juxtapose the coded indicia of said card and the coded indicia of said at least one inner surface of said receptacle.

3. The device of claim 2 wherein said transport means includes:
   a. bias means adapted to contact said card when the latter is inserted in said receptacle, and
   b. motion transmitting means coupling said externally operable projection and said bias means to control movement of the latter in response to operation of said projection.

4. The device of claim 3 wherein said bias means includes a plate member movably disposed in said device and adapted to transport said card thereon in response to operation of said projection.

5. The device of claim 3 wherein said motion transmitting means includes a rotatable member axially mounted in said device for rotation in response to operation of said projection, and wherein said bias means includes a stationary member cooperating with said rotatable member so as to move axially thereof in response to rotation of said rotatable member.

6. The device of claim 1 including a plurality of primary circuit breakers in addition to said primary switch means and closable substantially simultaneously in response to juxtaposition of the coded indicia of said card with the coded indicia of said at least one inner surface of said receptacle, said circuit breakers interrupting circuits electrically controlling selected accessories of said motor vehicle.

7. The device of claim 6 including secondary switch means interposed in the circuit of each primary circuit breaker, and means preventing closure of said secondary switch means prior to closure of said primary switch means.

8. The device of claim 7 wherein said transport means includes an externally operable projection, bias means for transporting said card within said receptacle, and motion transmitting means connecting said bias means and said projection for transmitting motion of said projection to said bias means to transport the card within the receptacle.

9. The device of claim 8 wherein said transport means includes secondary switch closing means for closing said secondary switch means after closure of said primary switch means and said primary circuit breakers.

10. The device of claim 1 wherein said coded indicia along said at least one inner surface of said receptacle comprise a plurality of orifices therein so positioned as to receive a respective plurality of pins arising from a surface of said coded card as the coded indicia thereof.

11. The device of claim 10 wherein said primary switch means and said primary circuit breakers comprise a plurality of microswitches corresponding to and positioned axially of said orifices so as to be contacted and closed by said pins upon receipt thereof within said orifices.

12. The device of claim 7 including externally operable tertiary switch means interposed in the circuit of at least one of said primary circuit breakers.

13. The device of claim 12 including electrically operable hood-release means for permitting access to a motor compartment of said motor vehicle, said hood-release means being electronically connected to a source of electrical power through said tertiary switch means, said secondary switch means, and said at least one primary circuit breaker.

14. The device of claim 12 including electronically operable storage compartment unlocking means for unlocking and permitting access to a storage compartment of said motor vehicle and electronically connected to a source of electrical power through said tertiary switch means, said secondary switch means, and a primary circuit breaker.

* * * * *